W. S. OVERLIN.
LOAD LIFTING MECHANISM FOR MOTOR TRUCKS.
APPLICATION FILED DEC. 14, 1918.
1,323,719.
Patented Dec. 2, 1919.
3 SHEETS—SHEET 3.
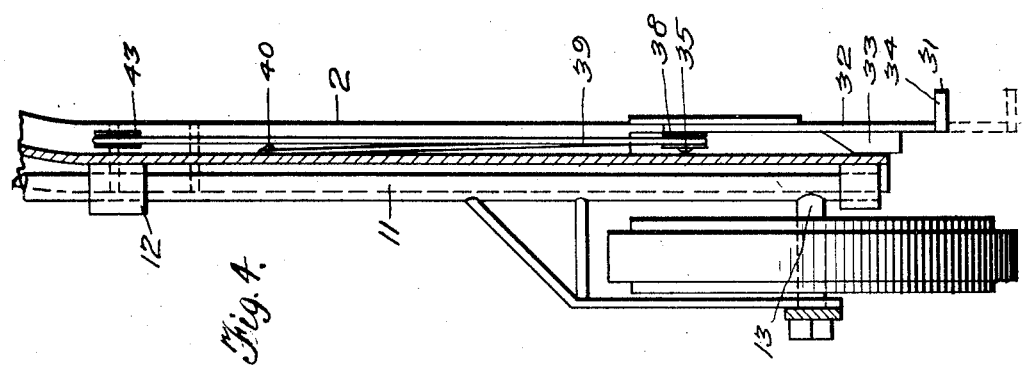
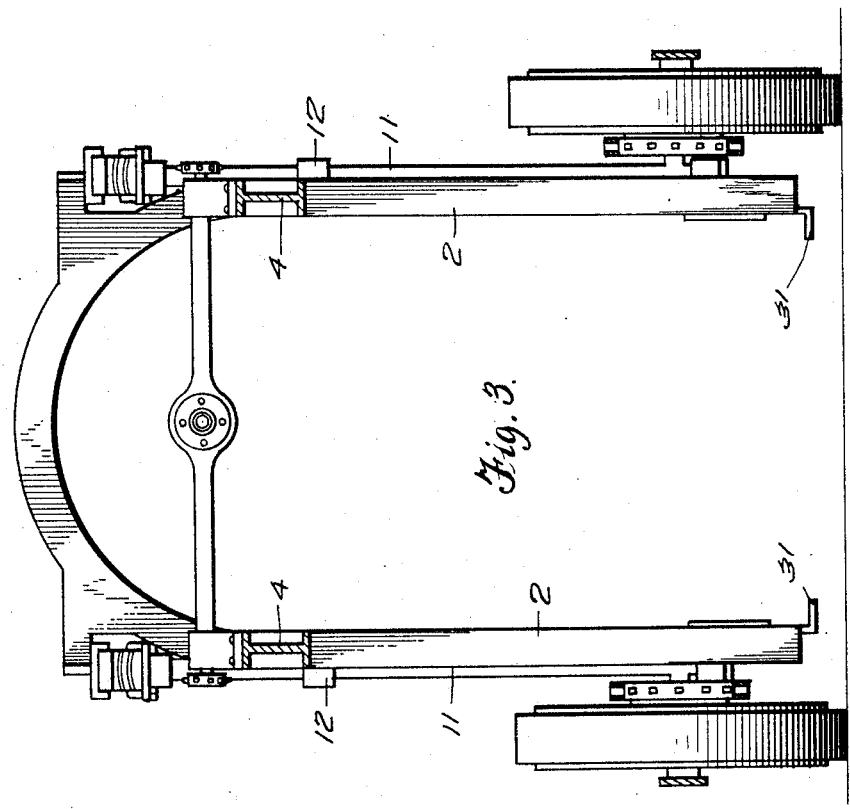
Inventor
William S. Overlin
By Howard Coombs
Attorney

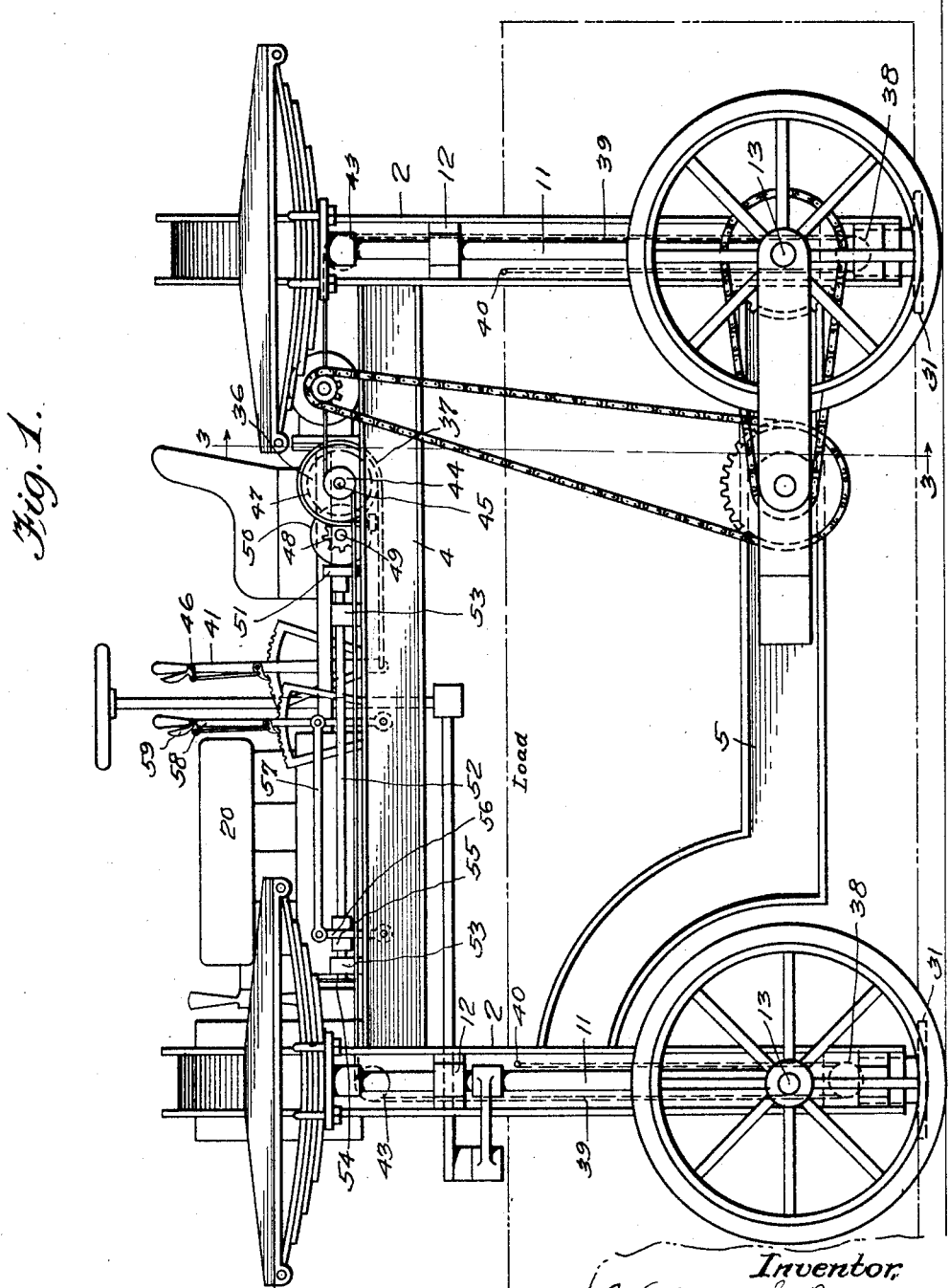

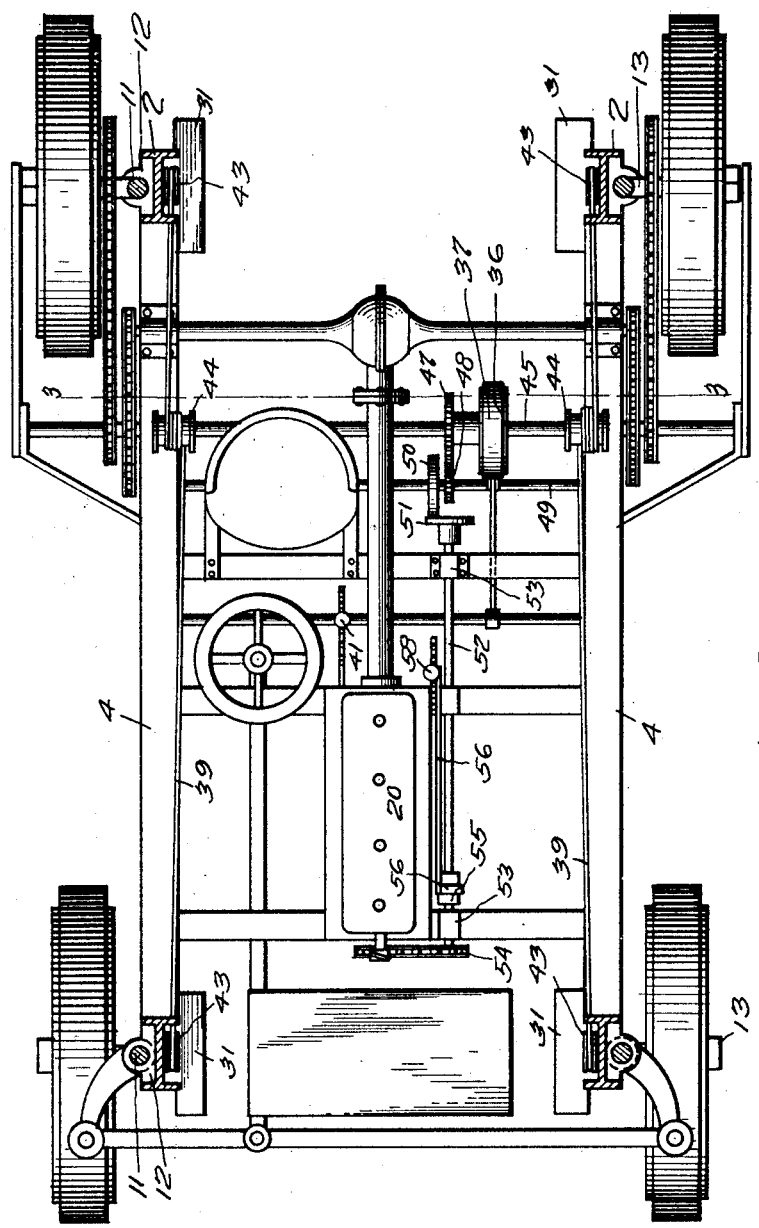

UNITED STATES PATENT OFFICE.

WILLIAM S. OVERLIN, OF OSWEGO, OREGON.

LOAD-LIFTING MECHANISM FOR MOTOR-TRUCKS.

1,323,719. Specification of Letters Patent. Patented Dec. 2, 1919.

Application filed December 14, 1918. Serial No. 266,667.

*To all whom it may concern:*

Be it known that I, WILLIAM S. OVERLIN, a citizen of the United States, residing at Oswego, in the county of Multnomah and State of Oregon, have invented new and useful Improvements in Load-Lifting Mechanism for Motor-Trucks, of which the following is a specification.

This invention relates to motor trucks for handling bulky loads, such as piles of lumber, and more particularly to trucks like that disclosed in my application for patent filed December 22, 1917, Ser. No. 208,393, (patented Dec. 31, 1918, No. 1,289,529,) of which this application is a continuation in part.

The truck therein described and claimed comprises a frame of inverted U shape, so that the truck can be run over, or straddle, the pile of lumber or other load to be conveyed, and the frame consists of two vertical arched I-beams, connected together by longitudinal members and the load engaging means consists of shoes slidably guided on the inside of the legs of said beams and connections from said shoes to the motor of the truck, whereby the load can be lifted off the ground and held elevated while the truck is transporting it to the place of delivery. It is this feature of my invention which is to form the subject matter of this application.

It is illustrated in the accompanying drawings, in which,

Figure 1 is a side elevation of a truck equipped with the improved form of load lifting mechanism, similar to that shown in Fig. 1 of the parent application aforesaid.

Fig. 2 is a plan view of the same, with parts removed so as to show the lifting mechanism more clearly.

Fig. 3 is a transverse section on the line 3—3 of Figs. 1 and 2, looking toward the rear of the truck, and Fig. 4 is a vertical section through the leg of one of the arch frame beams, showing the load engaging shoe and its lifting connections.

In these views, the vertical legs of the arched I-beams of the frame are shown at 2, and the longitudinal side members connecting the same at 4 and 5. The spindles 13 of the truck wheels are carried by rods 11, mounted to slide (and turn, in the case of the front steering wheels), in bearings 12, bolted to the outside of the legs 2. The spring connection of said rods 11 to the frame members is shown in Fig. 1, and is fully described and claimed in the said parent application, but not here, as it forms no part of the present invention. On the inside of said legs, and guided between their flanges and angle irons 29, secured to the same, are slidably mounted the load engaging shoes 31 which, as shown in Fig. 4, consist of angle-irons, having a short horizontal arm 34 and a relatively long vertical arm 32, to the back of which are secured ribs 33, to hold it spaced from the leg 2 and between which is journaled, on a stud 35 projecting from said arm 32, a sheave 38, around which passes a cable 39, one end of which is led up and secured to the leg 2 at 40. From the sheave 38, the cable leads up the leg 2 to and over an idler pulley 43, mounted on said leg, and from thence to a winding drum 44.

There are two of such drums fast on a shaft 45, journaled transversely on the upper side frame members 4, and the two cables from the shoes in the rear arched frame member are passed around and secured to said drums in one direction, while the two cables from the front shoes pass around said drums in the other direction and are secured thereto. Thus, when said shaft and drums are rotated in one direction, all four cables are wound up and all the shoes are elevated and, when the shaft and drums are rotated in the other direction, all four shoes are lowered.

To operatively connect said shaft 45 to the crank shaft of the motor 20, it carries a gear 47 with which meshes a pinion 48, mounted on a countershaft 49, which also carries a friction wheel 50. There may be two gears 47 and two pinions 48, one pair adjacent to each winding drum, as shown, but it is immaterial as far as the operation is concerned. The friction wheel 50 is driven, when desired, by a friction disk 51, carried on the end of a longitudinal shaft 52 slidably journaled in bearings 53 and operatively connected to the crank shaft of the motor by a sprocket chain 54. A yoke 55 is carried by said shaft 52, the same being engaged by a link 56, connected by another link 57, to an operating lever 58, held in adjusted position by the usual spring catch device indicated at 59.

When the load is to be lifted, the truck is run over the same and the horizontal arms 34 of the shoes are engaged under boards supporting the load, and then the shaft 52 is longitudinally shifted to bring the disk 51 into frictional contact with the wheel 50, whereby, the motor having been started, the cables 39 are wound up on the drums 44 and the load is lifted to the desired height. To hold the load thus elevated while the truck is conveying it to the desired place, drum shaft 45 carries a brake drum 36, around which passes a band or strap 37, one end of which is secured to the frame and its other end to another hand lever 41, equipped also with a pawl and ratchet latch device 46. As soon as the brake is applied, the shaft 52 is shifted longitudinally to disengage the friction disk and wheel. To deposit the load, the brake band 37 is gradually released to allow the cables to unwind under the weight of the load.

It will be evident that the invention is not necessarily embodied only in the exact arrangement shown and that some changes and rearrangement may be made without departing from the spirit of the invention as expressed in the following claims.

1. Load-lifting mechanism comprising the combination with a frame composed of four vertical standards and horizontal bars connecting the same, of a motor mounted longitudinally on the frame, a hoisting drum shaft mounted transversely on the same, a friction wheel on said shaft, a longitudinally movable shaft mounted parallel to the motor shaft and carrying a friction wheel adapted to engage the wheel on the drum shaft, a chain and sprocket drive connecting the motor shaft to said movable shaft, means to move the latter and means to hold it in adjusted position, load-engaging shoes mounted to slide in each of said standards, and cables running from said shoes to said hoisting drum shaft.

2. Load-lifting mechanism comprising the combination with a frame having four posts, of a load-engaging shoe slidable in each post, a drum shaft on the frame, a cable running from said shaft to each of said shoes, a motor on the frame, and a disconnectible friction drive between said motor and said shaft.

In testimony whereof I have hereunto set my hand.

WILLIAM S. OVERLIN.